US009231641B2

(12) United States Patent
Sachs et al.

(10) Patent No.: US 9,231,641 B2
(45) Date of Patent: Jan. 5, 2016

(54) TEMPERATURE MONITORING CABLE

(71) Applicant: MOTOROLA SOLUTIONS, INC, Schaumburg, IL (US)

(72) Inventors: Daniel Grobe Sachs, Elmhurst, IL (US); Charles B Jaris, Schaumburg, IL (US); Ellis A Pinder, Davie, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 62 days.

(21) Appl. No.: 14/081,770

(22) Filed: Nov. 15, 2013

(65) Prior Publication Data

US 2015/0140936 A1 May 21, 2015

(51) Int. Cl.

*H04B 7/00* (2006.01)
*H04B 1/3888* (2015.01)
*H04W 4/22* (2009.01)
*G01K 13/00* (2006.01)

(52) U.S. Cl.

CPC ............... *H04B 1/3888* (2013.01); *H04W 4/22* (2013.01); *G01K 13/00* (2013.01)

(58) Field of Classification Search

CPC ........... H04B 1/385; H04W 4/22; H04W 4/10
USPC ............ 455/518, 519, 520, 521, 73, 81, 90.2, 455/67.11
See application file for complete search history.

(56) References Cited

U.S. PATENT DOCUMENTS

| | | | | |
|---|---|---|---|---|
| 6,286,992 | B1 | 9/2001 | Kyrtsos | |
| 6,608,557 | B1 | 8/2003 | Menard | |
| 7,155,254 | B2 | 12/2006 | Pinder | |
| 7,424,312 | B2 | 9/2008 | Pinder et al. | |
| 7,526,317 | B2 * | 4/2009 | Pinder et al. | 455/557 |
| 2002/0135488 | A1 * | 9/2002 | Hibbs et al. | 340/584 |
| 2008/0045169 | A1 | 2/2008 | Zetzl et al. | |
| 2010/0238020 | A1 * | 9/2010 | Pellen | 340/533 |
| 2013/0090888 | A1 | 4/2013 | Anderson et al. | |
| 2014/0203938 | A1 * | 7/2014 | McLoughlin et al. | 340/584 |

FOREIGN PATENT DOCUMENTS

| | | | |
|---|---|---|---|
| CN | 2733326 | Y | 10/2005 |
| JP | 54103590 | A | 8/1979 |
| WO | 2005072166 | A2 | 8/2005 |
| WO | 2012154970 | A2 | 11/2012 |

* cited by examiner

*Primary Examiner* — Tuan Pham
(74) *Attorney, Agent, or Firm* — Barbara R. Doutre

(57) ABSTRACT

A portable communication system (100) comprises a portable radio (102) and a radio accessory (106) coupled through an interface cable (108). The interface cable (108) provides an electronic interface for remote access to radio functions at the radio accessory (106). The interface cable (108) further provides a temperature sensor (110) integrated therein for monitoring environmental conditions external to the portable communication system. The portable communication system (100) generates user notifications indicating extreme temperature conditions. Notifications of extreme temperature conditions may also transmitted from the portable communication system (100) to other radios, such as a land mobile radio (120), dispatch center (130), or other radio (140) operating within a communications network.

14 Claims, 4 Drawing Sheets

RADIO 140
DISPATCH CENTER 130
LMR 120
106 132 116 126 114 110 118 112 108 128 134 124 122 102 104
RADIO 100

TEMPERATURE MONITORING CABLE

FIELD OF THE DISCLOSURE

The present invention relates to portable communication systems, and more particularly to portable communication systems operating under adverse temperature conditions in a public safety environment.

BACKGROUND

In today's public safety environment, a portable communication system typically utilizes a portable two-way radio in conjunction with a radio accessory, such as a remote speaker microphone, headset or other wired accessory. Such accessories are typically coupled to the radio via an interface cable to provide remote access to radio features, such as speaker, microphone and push-to-talk (PTT) features. These portable communication systems are often used under adverse temperature conditions, such as encountered in fire rescue, where excessive heat may cause damage to the devices. When used in a fire rescue environment, the radio accessory and interface cable tend to be more susceptible to heat damage than the radio, because the accessory and cable are typically worn externally, while the radio tends to be worn beneath protective clothing, such as a turncoat. Wearing the protective clothing may also leave the user unaware of the surrounding temperature. Maintaining communications amongst rescue personnel is extremely important in terms of physical safety of the user and proper operation of the radio devices. The ability to provide early detection and warning of undesirable temperature conditions would thus improve user safety and minimize damage to the portable system.

Accordingly, it would be desirable to have a portable communication system for operation under adverse temperature conditions.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
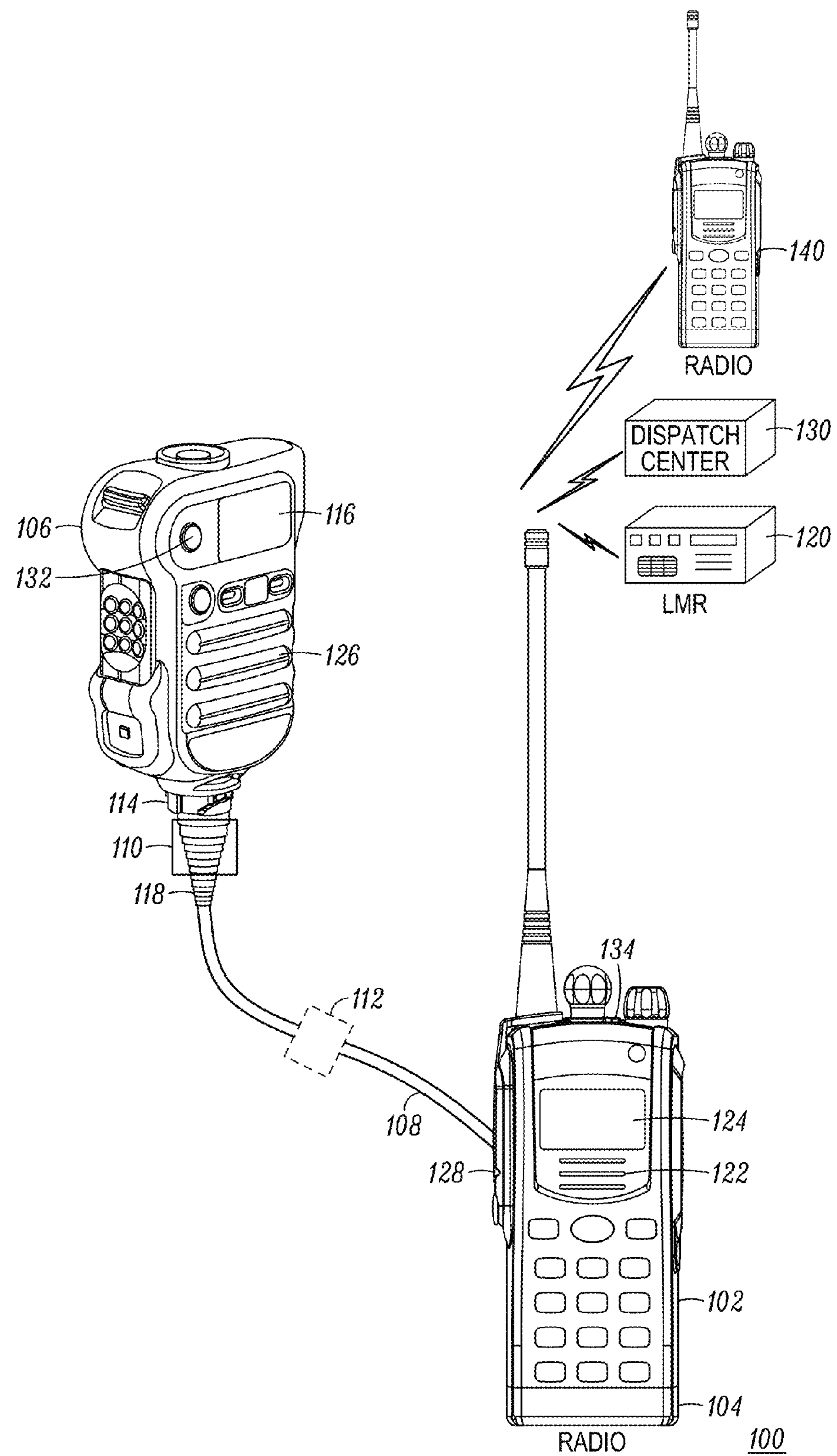
FIG. 1 is a portable communication system in accordance with various embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an improved portable communication system formed of a portable radio and radio accessory coupled through a cable. In accordance with the various embodiments of the disclosure, a temperature sensor is integrated as part of the cable to add temperature monitoring capability of the external environment. Embedding the temperature sensor within the cable's strain relief or collar, which is worn externally, allows for a more accurate temperature reading than placement in the radio which is often worn beneath a rescuer's turncoat. The cable-based sensor is multiplexed onto existing communication lines so that no changes are needed to the radio accessory. The ability to detect accurate extreme temperature thresholds is extremely beneficial to user safety, minimizing physical damage to the system and maintaining communications.

FIG. 1 is a portable communication system 100 formed in accordance with various embodiments. Portable communication system 100 comprises a portable radio 102 powered by a battery 104 coupled to a radio accessory 106 by interface cable 108. The portable radio 102 and battery 104 provide data and power to the radio accessory 106 via the accessory interface cable 108. The portable radio 102 provides two-way radio communication using a radio controller, transceiver, and antenna as understood to be known in the art of two-way radio communication. The radio accessory 106 may comprise a remote speaker microphone (RSM), headset or other radio accessory which provides remote access to certain radio interface features, such as speaker, microphone and push-to-talk (PTT) features.

The interface cable 108 comprises a plurality of wires wrapped in insulation having a strain relief 118 at one end and a radio universal accessory interface (UAI) 128 at the other end. The interface cable 108 provides an electrical communication interface between the portable radio 102 and radio accessory 106. In accordance with the various embodiments, a temperature sensor 110 is integrated as part of the cable to add temperature monitoring capability of the external environment. Embedding the temperature sensor 110 within the cable's strain relief 118 or collar 114, facilitates exposure of the sensor to the external environment without adding external modules or taking up additional space at the radio accessory 106. Exposure of the cable-based sensor 110 to the external environment allows for a more accurate temperature reading than placement in the radio which is often worn beneath a rescuer's turncoat.

The cable temperature is measured as a means of environmental monitoring to protect the health and safety of the user in extreme environments. The temperature sensor 110 is monitored by the portable radio 102, and in response to predetermined exposure thresholds being exceeded, the radio sends a thermal emergency indicator to the user and also transmits an emergency declaration signal to another radio, such as a land mobile radio (LMR) 120, a dispatch center 130, another portable radio 140, and/or other radios operating within a communications network. For the purposes of this application other radios receiving the emergency declaration signal may be any portable, mobile/vehicular, or stationary communication device capable of receiving a radio frequency (RF) signal. The thermal emergency condition is thus identified by the portable radio 102 and transmitted directly by the portable radio 102 to other radios without any involvement from the radio accessory 106 or dependence on the use position of the radio accessory. The thermal emergency indicator to the user can take the form of a display message on an accessory display 116 of the radio accessory 106, an audible alert at a speaker of the radio accessory 106, vibration alert at the radio accessory 106, and/or a light emitting diode (LED) 132 at the radio accessory 106. The thermal emergency indicator to the user can also take place at the portable radio 102 in the form of a display message on a radio display 124 of the portable radio 102, an audible alert at a radio speaker 122 of the portable radio 102, a vibration alert at the portable radio, and/or a light emitting diode (LED) 134 at the portable radio 102. The display alerts, LED alerts, audible alerts, and vibration alerts are all examples of user interface outputs of the portable devices. Notifications of extreme temperature conditions can thus be generated locally at one or more of the portable radio and/or RSM, as well as be transmitted to other radios. Hence, the portable communication system 100 is configurable to allow for various types of alerts and alert locations; however the transmission control of the alerts remains with the portable radio 102.

Different temperature thresholds can be set to trigger a thermal warning notification. For example, a first temperature threshold can be set for temperatures associated with being harmful to a human body, and a second temperature threshold can be set for temperatures associated with damage to the product or certain parts of the product. Thresholds indicating shutdown of different radio functions can be set. The portable radio 102 utilizes a time-temperature exposure metric to declare a temperature emergency and flag the portable radio 102 as to the potential compromised thermal condition. The tripped notifications for the various thresholds can be sent to the user. For example, the different thresholds can be indicated by different warning messages on the radio accessory display 116 and or portable radio display 124, such as or "THERMAL ALERT 1," "THERMAL ALERT 2," THERMAL ALERT 3" to provide an indication of changes in the thermal condition to which the cable-based sensor 110 is being exposed. Likewise, the audible alerts from the speaker 126 of the radio accessory 106 or the radio speaker 122 of the portable radio can send different audio messages, for example: "THERMAL ALERT 1," "THERMAL ALERT 2," THERMAL ALERT 3." The LED 132 of the radio accessory 106 or the LED 134 of the portable radio 102 can illuminate in different blinking patterns and/or colors for the various thermal exposure thresholds.

Integration of the temperature sensor 110 within the strain relief 118 or collar 114 of the interface cable 108 is advantageous in terms of space and providing a seamless, non-cluttered, presentation to the user, and further ensures accurate temperature measurements of the external environment since the radio accessory 106 tends to be worn outside of clothing. However, if an application warrants the use of additional space, then an alternative embodiment is shown in dashed lines as temperature sensor 112, where the sensor is moved further down the cable. This placement provides an alternate form factor, however as long as the sensor 112 is exposed to the external environment, the portable communication system 100 still accomplishes the operable aspects discussed previously.

Figure 2:
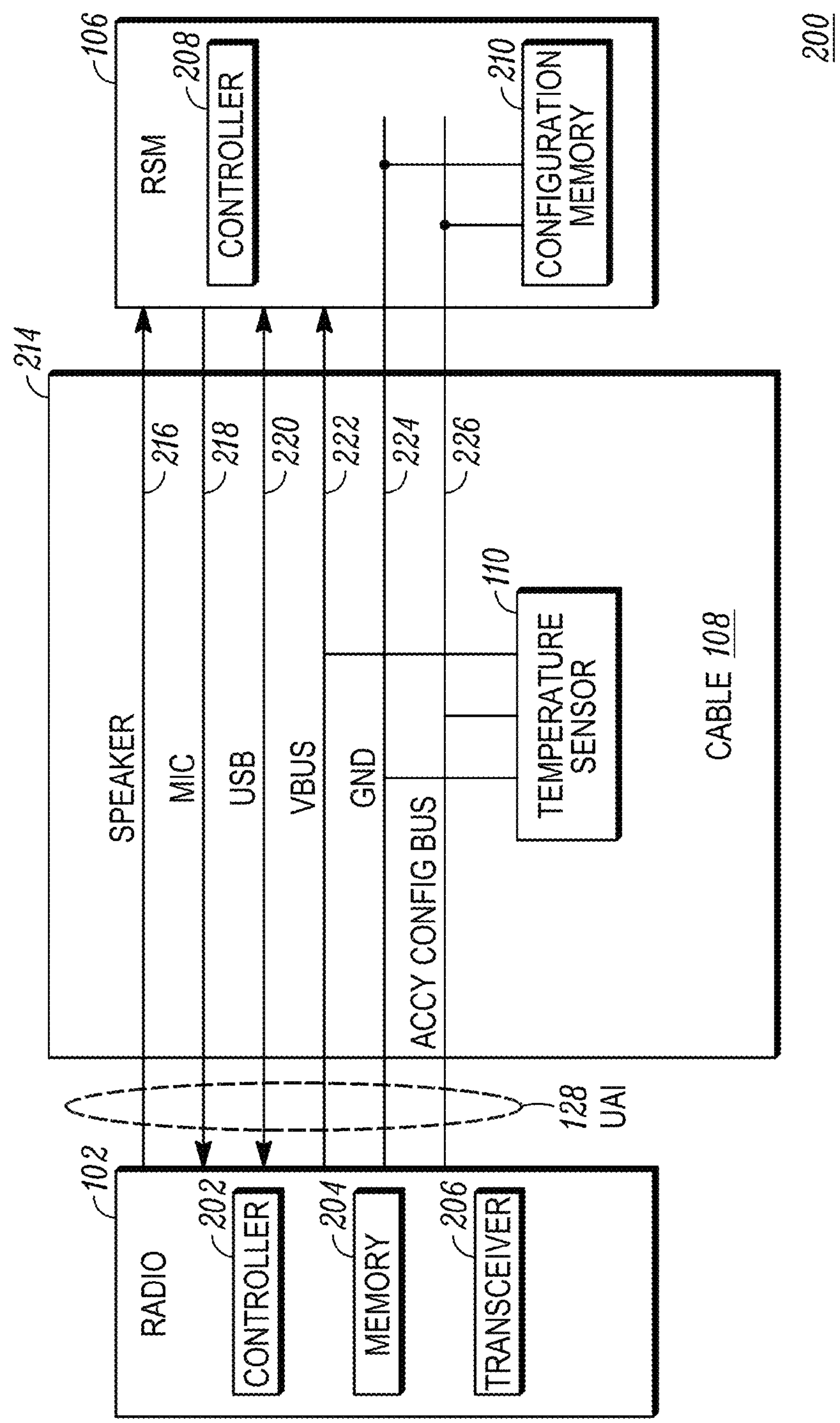
FIG. 2 is a method for the portable communication system of FIG. 1 to detect adverse temperature conditions in accordance with the various embodiments of the disclosure.

FIG. 2 shows a block diagram 200 for the accessory interface cable 108 coupled between portable radio 102 and the radio accessory 106, shown here as remote speaker microphone (RSM) 106. Portable radio 102 comprises a radio controller 202, a memory 204 and a transceiver 206 for two-way radio communication. The portable radio 102 interfaces with the cable 108 via the universal accessory interface (UAI) 128. The strain relief 118 and collar 114 of cable 108 interface with the RSM 106. The RSM 106 provides remote access to certain radio features, for example speaker, microphone and push-to-talk (PTT) features. The RSM 106 may optionally comprise a controller 208, however some of the embodiments of the disclosure may be supported without requiring the controller 208 in the RSM 106. The RSM 106 further comprises a configuration memory 210. The configuration memory 210 is a device that provides an additional memory for storing information pertaining to the accessory such as identification ID, accessory type, and port configuration information. The configuration memory 210 is preferably a single-wire serial memory integrated circuit (IC) providing non-volatile storage and operating as a read-only device, which can only be read by the portable radio 102. In other embodiments, the configuration memory 210 may comprise a multi-wire configuration memory device. The operation of the configuration memory 210 is independent of the RSM 106.

A wired interface 214 runs through interface cable 108 providing interface lines for speaker 216, microphone 218, universal serial bus (USB) 220, voltage bus (Vbus) 222, ground (GND) 224, and accessory configuration communication bus (Accy Config Bus) 226. The universal serial bus (USB) 220 is only used in applications involving a controller 208 within the RSM 106, and is not required for all of the embodiments. For the preferred single-wire applications, the accessory configuration communication bus 226 comprises a single-wire bus utilized in conjunction with a single-wire memory configuration device. For multi-wire applications, the accessory configuration communication bus 226 comprises a multi-wire bus utilized in conjunction with a multi-wire memory configuration device.

In accordance with the various embodiments, the cable-based sensor 110 is advantageously multiplexed onto existing communication lines between the portable radio 102 and the RSM 106, so that no changes to the radio interface or RSM head are required to support the enhanced cable. The Vbus 222, GND 224 and accessory configuration communication bus (Accy Config Bus) 226 preferably operate as part of the universal accessory interface (UAI) utilizing single-wire technology. The addition of the temperature sensor 110 does not interfere with the readout of the accessory's configuration memory 210, which is stored in an additional memory IC also connected to the single-wire interface. While the single-wire embodiment is a preferred embodiment in terms of space savings, other non-single wire embodiments can be implemented and will be discussed further on.

The basis of single-wire technology is a serial protocol using a single data line plus ground reference for communication. A single-wire master initiates and controls the communication with one or more single-wire slave devices over single data line. Each single-wire slave device has a unique, unalterable, factory-programmed, 64-bit ID (identification number), which serves as device address on the single-wire bus. The 8-bit family code, a subset of the 64-bit ID, identifies the device type and functionality. Examples of architectures for interfacing a radio with an accessory and for self-configuring an accessory device using single-wire technology may be found for example in U.S. Pat. No. 7,424,312, assigned Motorola Solutions, Inc. which is herein incorporated by reference. The universal accessory interface (UAI) 128 on the portable radio 102 provides a physical and electrical interface to the configuration memory 210 for transferring configuration data from the portable radio 102 to the RSM 106.

Many single-wire devices have no pin for power supply; they take their energy from the single-wire bus (parasitic supply). However, in the embodiment shown in FIG. 2, the temperature sensor 110 is shown optionally supplied by Vbus 222. In accordance with the various embodiments, the temperature sensor 110 comprises a single-wire temperature sensor attached in parallel across the accessory configuration communication bus 226 and ground (GND) 224, wherein the accessory configuration communication bus runs a single wire interface protocol between the radio controller 202 and the accessory's configuration memory 210. Thus, the same single data line (accessory configuration communication bus 226) is accessed by both the temperature sensor 110 and the configuration memory 210.

In accordance with the various embodiments, the external temperature is monitored in a multiplexed manner Temperature readings are stored within the memory 204 of the portable radio 102. Upon determining that the temperature has exceeded one or more predetermined thresholds, the portable radio 102 sends user notifications to the radio's display, and the RSM's display. The user notification to the RSM display would be sent, for example, from the portable radio 102 over the USB 220 to the RSM 106. Other notifications, such as audible alerts, vibrational alerts, and LED alerts may also be used.

In operation, the portable radio 102 periodically polls the cable based temperature sensor 110 at accessory configuration communication bus 226 and the temperature reading is compared to a predetermined exposure threshold stored in the portable radio's memory 204. The polling acquires a plurality of temperature readings, and the exposure threshold is based on, for example how long a user can withstand a certain temperature environment without bodily harm and/or how long the equipment can continue to operate. When the exposure threshold is exceeded, the portable radio 102 sets a compromised bit. When the compromised bit is set, the portable radio 102 flags a compromised condition in, for example flash memory. The notification of a thermal emergency is transmitted to a dispatch center 130 and/or other radios 120 via the radio network. Reporting the compromised condition to the user is accomplished by triggering a message on the display of the radio and/or RSM 106 via USB 220. Other notifications, such as audible alerts, vibrational alerts, and LED alerts may also be used.

Figure 3:
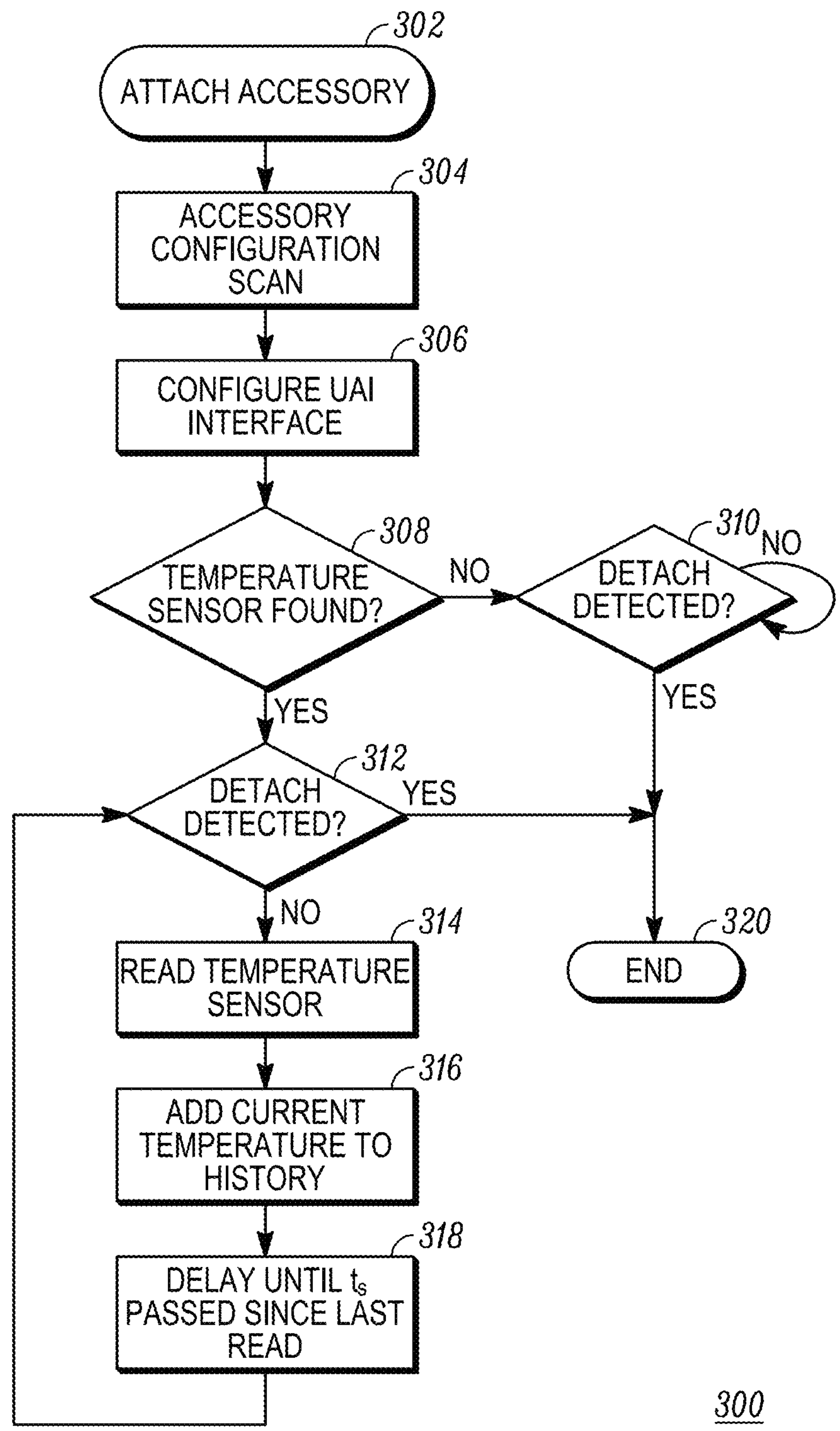
FIG. 3 is a method for a detecting adverse temperature conditions in accordance with the various embodiments of the disclosure.

Referring to FIG. 3, there is provided a flowchart for a method 300 for monitoring temperature conditions using the portable communication system of FIG. 1 in accordance with the various embodiments. The method 300 begins at 302 by attaching the radio accessory to the portable radio, and performing an accessory configuration scan at 304. During the configuration scan, the radio detects all the devices on the single wire bus (accessory configuration communication bus 226), and in accordance with the various embodiments detecting the temperature sensor 110 and the configuration memory IC 210. The universal accessory interface (UAI) is then configured at 306 based on the detected elements. If a temperature sensor is not detected at 308, then the system checks for accessory detachment at 310, and when such detachment is detected the method ends at 320. When a temperature sensor is detected at 308, the method again senses for the accessory being detached at 312, and if detachment is confirmed the method ends at 320. If the radio accessory is still attached to the portable radio at 312, the temperature sensor is read at 314 and the temperature is added to a temperature history list stored in the radio's memory at 316. After a predetermined delay ($t_s$) at 318, the method returns to check for accessory detachment at 312. Method 300 thus provides a basis for storing operational temperatures into a history which can be used in conjunction with the time-temperature exposure metric which is managed by the method of FIG. 4.

Figure 4:
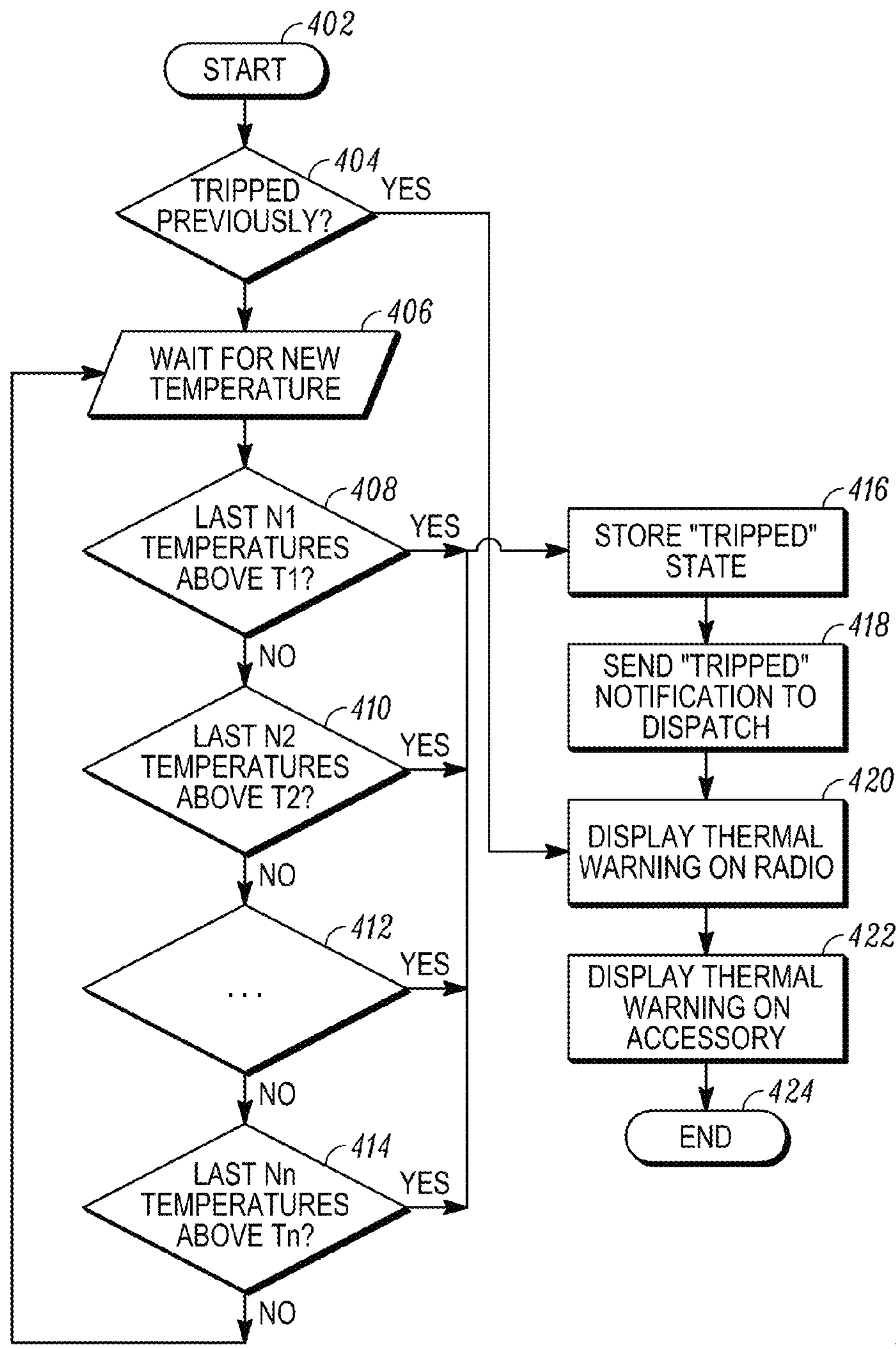
FIG. 4, is a flowchart of a method for detecting extreme temperature conditions using the portable communication system of FIG. 1 in accordance with the various embodiments.

Referring to FIG. 4, there is provided a flowchart of a method 400 for detecting extreme temperature conditions using the portable communication system of FIG. 1 in accordance with the various embodiments. The method 400 begins at 402 by checking for previous detections of extreme temperature thresholds at 404. If a temperature threshold has been tripped at 404, an indication of a compromised thermal condition is displayed on the radio at 420 as well as displayed on the accessory at 422 prior to ending the process at 424. As mentioned previously audible alerts, vibrational alerts, and/or LED alerts may also provide user notifications of the tripped temperature condition. The check for previous trigger alerts at 404 allows a user to know if a radio has been previously operating within an adverse temperature environment that might have compromised system operability. The compromised thermal condition notification is retained until reset by a user input to the radio. This notification ensures the user is aware of the potential compromised condition.

If the system has not been previously tripped by a temperature extreme at 404, then the process monitors for new temperature readings at 406. The first reading (N1), or group of readings, is compared to a predetermined first temperature threshold (T1). The system continues to periodically monitor temperatures of the sensor, comparing the readings to different predetermined temperature thresholds at 410, 412, and 414. A predetermined number of readings can be taken to avoid a single reading causing a false trigger. Again, different temperature thresholds can be set for different parameters and different warning levels, such as temperatures associated as being harmful to the user, and temperatures that can cause potential damage to the devices, and exposure to certain temperatures over time. If any thresholds are exceeded then a tripped notification is stored at 416 and transmitted to a dispatch center and/or other radios at 418 as well as being displayed as a display alert (and/or LED alert, audio alert, vibration alert) at the portable radio at 420 and/or at the radio accessory at 422.

While the preferred embodiments have thus been described in terms of single-wire technology as part of space minimization and minimizing the number of interface lines, the temperature sensor 110 may also be implemented as a non-single wire temperature sensor, and the configuration memory 210 may also be embodied in other non-single wire memory devices, such as a two-wire memory device, a three-wire memory device to name a few. The accessory configuration communication bus 226 can provide bi-directional data and can clock signals to and from the configuration memory device 210.

Accordingly, there has been provided a portable communication system having a radio accessory coupled to a portable radio through an interface cable, the cable providing temperature monitoring of the environment external to the system. Integrating the temperature sensor within part of the cable keeps the accessory easily portable and avoids having to have the user carry additional battery-powered devices. Locating a single-wire temperature sensor within the strain relief or collar of a radio accessory, for example by locating it on an interface PCB embedded in the strain relief between the high density connector and cable wire assembly, allows the temperature monitoring to take place without having to reconfigure the accessory itself. The system can advantageously provide user notifications at the radio accessory and the portable radio. The system advantageously provides triggering radio alerts that can be monitored at a dispatch or commander's station outside of the environment, such as a fire scene, over the high reliability two-way radio network thereby providing excellent coverage. The portable communication system thus improves the ability to protect the user's mission critical communications system by warning that excessive temperatures may potentially cause a portion of the communication system to fail or harm the user.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication system, comprising:

a portable radio;

a radio accessory; and an interface cable providing an electrical communication interface between the radio accessory and the portable radio, the interface cable comprising a temperature sensor integrated therein to monitor an external environment around the portable communication system; and wherein the portable radio periodically polls the temperature sensor for temperature readings and applies an exposure threshold to the temperature readings to determine a compromised thermal condition, the portable radio flagging a compromised thermal condition, the portable radio reporting the compromised thermal condition as a thermal emergency to a dispatch center and transmitting an emergency thermal alert to a user interface output of the portable radio.

2. The portable communication system of claim 1, wherein the temperature sensor detects a first temperature threshold that can harm a user of the portable radio, and a second temperature threshold that can damage the portable communication system.

3. The portable communication system of claim 1, wherein the radio accessory is a remote speaker microphone (RSM), and the interface cable comprises a strain relief within which the temperature sensor is embedded.

4. The portable communication system of claim 1, wherein the radio accessory comprises a remote speaker microphone (RSM).

5. The portable communication system of claim 1, wherein the temperature sensor comprises a multi-wire temperature sensor multiplexed on an accessory configuration communication bus between the portable radio and the radio accessory.

6. The portable communication system of claim 1, wherein the temperature sensor comprises a single-wire temperature sensor multiplexed on a single-wire bus between the portable radio and the radio accessory.

7. The portable communication system of claim 1, wherein the radio accessory is a remote speaker microphone (RSM) having a single-wire configuration memory, and the temperature sensor is a single-wire temperature sensor, the single-wire configuration memory and the single-wire temperature sensor being coupled to a single-wire bus operating with a single wire protocol.

8. The portable communication system of claim 1, wherein the portable radio uses a time-temperature exposure metric to determine and declare a thermal emergency based on the monitored environmental temperature and to flag the portable radio to a potential compromised condition.

9. The portable communication system of claim 1, wherein the bit is reset in response to a user-input to the portable radio.

10. A method for a portable communication system to determine thermal exposure, comprising:

multiplexing a cable-based temperature sensor onto an accessory configuration communication bus between a portable radio and a radio accessory; and at the portable radio:

periodically polling the cable-based temperature sensor for temperature readings;

applying an exposure threshold to the temperature readings;

setting a compromised bit in response to the exposure threshold being exceeded;

transmitting a thermal emergency notification to a dispatch center in response to a compromised bit being set; and triggering a compromised thermal condition message at a user interface output of the portable radio or the radio accessory.

11. The method of claim 10, wherein the cable-based temperature sensor is a single-wire temperature sensor, and the accessory configuration communication bus is a single-wire bus.

12. The method of claim 10, wherein the cable-based temperature sensor is a multi-wire temperature sensor, and the accessory configuration communication bus is a multi-wire bus.

13. The method of claim 10, wherein the cable-based temperature sensor is embedded within a strain relief or collar of a cable.

14. The method of claim 10, further comprising:

retaining the compromised thermal condition message until reset by a user input to the portable radio.

* * * * *